(12) United States Patent
Gerin et al.

(10) Patent No.: US 11,822,990 B2
(45) Date of Patent: Nov. 21, 2023

(54) CONTACTLESS CHIP CARD WITH METAL CORE

(71) Applicant: SMART PACKAGING SOLUTIONS, Rousset (FR)

(72) Inventors: Guillaume Gerin, Rousset (FR); Stephan Danler-Baumgartner, Rousset (FR); Damien Richard, Rousset (FR)

(73) Assignee: SMART PACKAGING SOLUTIONS, Rousset (FR)

( * ) Notice: Subject to any disclaimer, the term of this patent is extended or adjusted under 35 U.S.C. 154(b) by 65 days.

(21) Appl. No.: 17/599,134

(22) PCT Filed: Mar. 27, 2020

(86) PCT No.: PCT/FR2020/000069
§ 371 (c)(1),
(2) Date: Sep. 28, 2021

(87) PCT Pub. No.: WO2020/193877
PCT Pub. Date: Oct. 1, 2020

(65) Prior Publication Data
US 2022/0172015 A1 Jun. 2, 2022

(30) Foreign Application Priority Data
Mar. 28, 2019 (FR) .................................. 1903299

(51) Int. Cl.
*G06K 19/077* (2006.01)
*G06K 19/07* (2006.01)

(52) U.S. Cl.
CPC ... *G06K 19/07745* (2013.01); *G06K 19/0723* (2013.01); *G06K 19/07743* (2013.01)

(58) Field of Classification Search
CPC ......... G06K 19/07745; G06K 19/0723; G06K 19/07743
(Continued)

(56) References Cited

U.S. PATENT DOCUMENTS

2017/0262749 A1   9/2017  Cox
2017/0316300 A1  11/2017  Herslow et al.
(Continued)

FOREIGN PATENT DOCUMENTS

FR    3032294 A1    8/2016

OTHER PUBLICATIONS

International Search Report (PCT/ISA/210) and Written Opinion (PCT/ISA/237) dated Jul. 13, 2020, by the European Patent Office as the International Searching Authority for International Application No. PCT/FR2020/000069.

*Primary Examiner* — Allyson N Trail
(74) *Attorney, Agent, or Firm* — BUCHANAN INGERSOLL & ROONEY PC

(57) ABSTRACT

A contactless or hybrid contact and contactless chip card, includes a card body composed of a stack of layers and provided with a cavity into which an electronic module is inserted. The electronic module includes a microelectronic chip connected to an inductive or capacitive coupling means for coupling with, or a physical connection to, at least one antenna arranged in the card body. The card body comprises a metal plate forming a core and the periphery of which has at least one edge delimiting at least one recess in which the other layers of the chip card are positioned.

10 Claims, 2 Drawing Sheets

(58) Field of Classification Search
USPC .......................................................... 235/492
See application file for complete search history.

(56) References Cited

U.S. PATENT DOCUMENTS

| | | |
|---|---|---|
| 2018/0018551 A1* | 1/2018 | Carrier ............. G06K 19/07788 |
| 2018/0197062 A1 | 7/2018 | Herslow et al. |
| 2021/0117744 A1* | 4/2021 | Finn ................. G06K 19/07769 |
| 2021/0192312 A1* | 6/2021 | Lotya ................... H01Q 1/2283 |

* cited by examiner

[Fig 1]
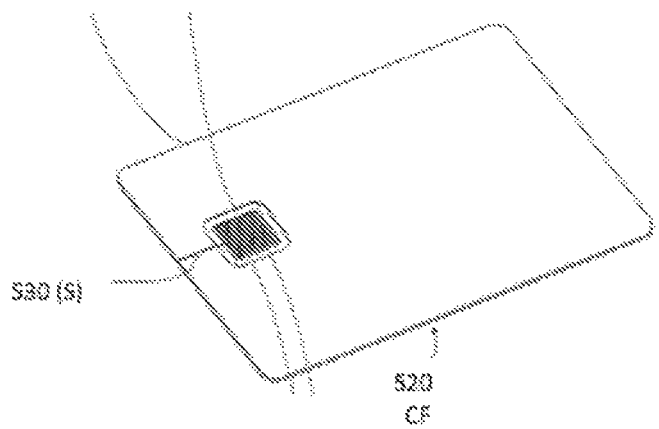
[Fig 2]
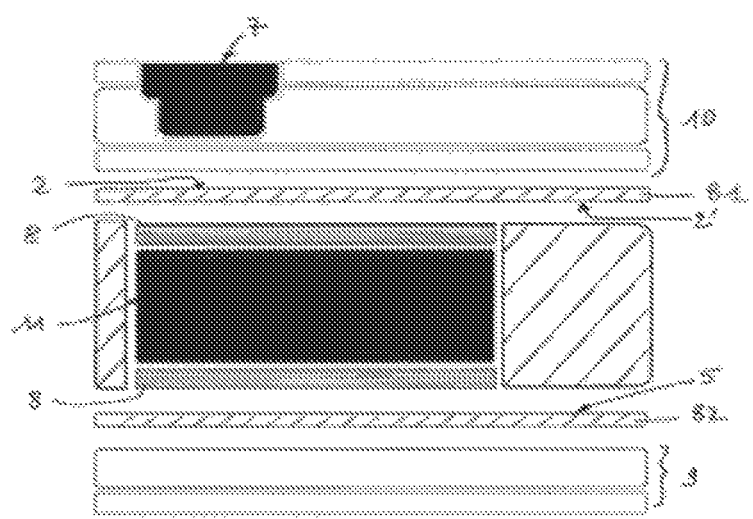
[Fig 3]
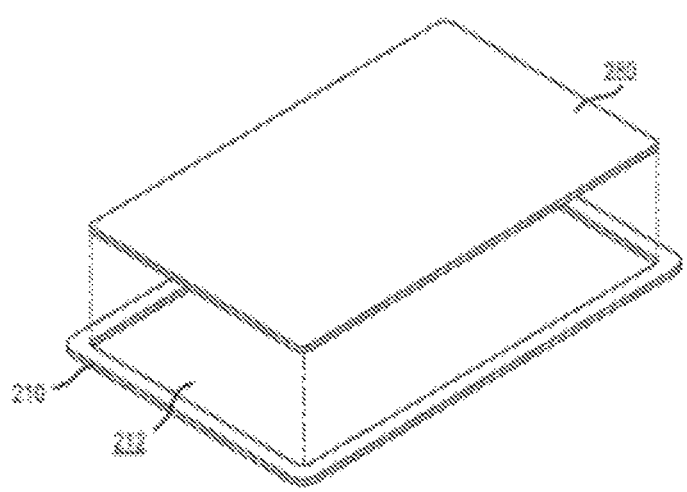

[Fig 4]
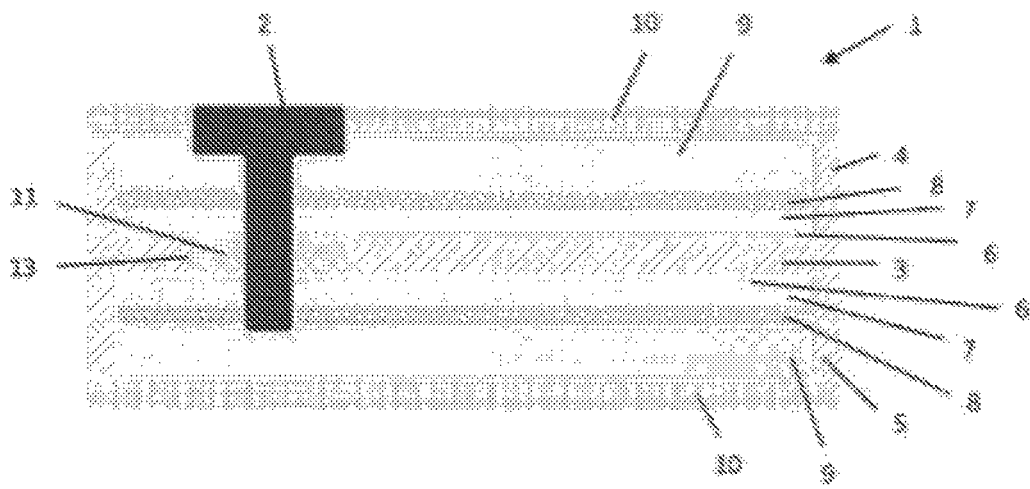
[Fig 5]
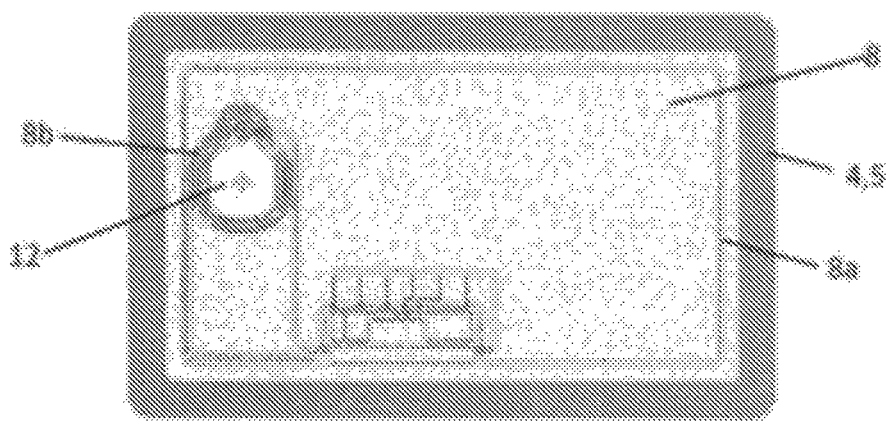
[Fig 6]
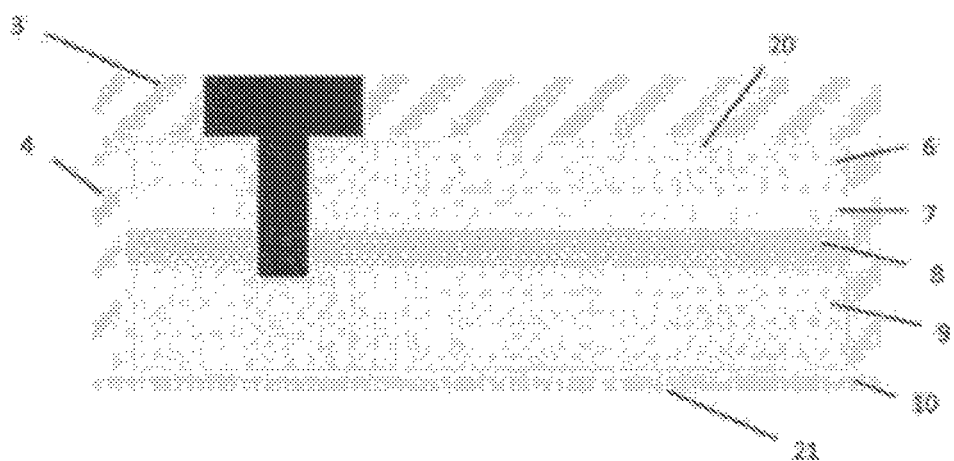

CONTACTLESS CHIP CARD WITH METAL CORE

The invention relates to contactless or hybrid contact and contactless identification cards, which are provided with a metal plate so as to strengthen the card or make it heavier.

PRIOR ART

The majority of known contactless chip cards or hybrid contact and contactless dual cards comprise a multilayer plastic card body, an electronic module inserted into a cavity of the card body and comprising a microelectronic chip, and an antenna arranged in the card body. The antenna of the card body is either electrically connected to output pads of the microelectronic chip or inductively coupled with the electronic module, which is itself provided with an antenna.

Known chip cards have a standardized format according to ISO standard 7810, and they are in general made of plastic for reasons of cost and flexibility.

Now, one developing segment of the market targets contactless chip cards, or contact and contactless dual chip cards, having physical characteristics that belong to a classier or more exclusive range, by virtue of a heavier weight that affords better handling, and a higher-end and classier appearance.

However, as is known, introducing a metal plate into a chip card has detrimental consequences on the electromagnetic level, as the metal plate forms a partial or even substantial shield against the electromagnetic waves that may propagate between the contactless chip card and the chip card reader. This has the possible consequence either of the contactless communication performance of known cards being impaired, or of the card operating only asymmetrically in contactless mode, that is to say that its operation in contactless mode is degraded on one face with respect to its operation on the other face.

A number of documents of the prior art have attempted to at least partially solve this shielding problem.

However, the development of the market for chip cards with a metal layer imposes even more exacting criteria: ideally, in addition to the electromagnetic performance criteria already mentioned, the card should be "heavy" with respect to conventional plastic cards, and make a different noise when it is dropped on a surface or a table. Furthermore, it is necessary for the metal layer to be clearly visible on the edge of the card or on the card body.

From document US 2018/0197062 a chip card is known that has a number of the aforementioned drawbacks. It comprises a card body that incorporates a thin metal layer, the edge of which is visible on the perimeter of the card. However, this metal layer does not have a raised edge, so that the other layers of the card body that are also visible on the perimeter of the card are at risk of being delaminated. Furthermore, the card body comprises an antenna located on one side of the metal layer that forms an electromagnetic shield, so that only one face of the card can be presented to a remote reader so as to validly communicate with it.

From document US 2017/0262749 A1 a method for manufacturing a multilayer insert for a contactless chip card is also known. The insert is placed into a cavity formed between two metal plates that are separated by a spacer. This method is not suitable for obtaining hybrid contact and contactless chip cards, as there is no visible contact terminal block. Furthermore, taking into account the electromagnetic shielding effect produced by the two metal plates, this method cannot be suitable for manufacturing contactless cards of radiofrequency performance compatible with the standards in force.

Finally, from document US 2017/0316300 A1, which expressly departs from metal cards, a card is known comprising a largely ceramic monolithic or multilayer body, onto which a metal or polymer substrate with a very low thickness possibly ranging up to 70 micrometers is added. Furthermore, the metal substrate is not visible on the periphery of the card, the visible edges of which are ceramic.

AIM OF THE INVENTION

One general aim of the invention is consequently to provide a chip card able to overcome the remaining drawbacks of known chip cards with a metal layer.

One particular aim of the invention is to provide an optimized contactless chip card or dual chip card structure provided with a plate of metal material that makes the card heavier, without this design having perceptible detrimental consequences for the operation of the chip card in contactless mode, and that is at the same time compatible with the aforementioned new criteria regarding the qualitative perception of handling the card by its user.

Another particular aim of the invention is to provide a chip card that is strengthened and made heavier by a substantial metal layer that is visible over the whole of the perimeter of the card, and that can be simply and economically industrially manufactured.

SUMMARY OF THE INVENTION

According to the principle of the invention, a metal plate the same size as the chip card is incorporated into the card body, so that its edges remain visible on the sides of the card, and over most of the thickness thereof. A through-hole is formed in the metal plate at the point where the electronic module is incorporated into the chip card. In addition, the metal plate comprises, on its periphery, at least one edge delimiting a volume, such that the other inner and outer layers of the chip card are positioned inside the volume delimited by this or these edges. As a consequence, the metal plate possesses a maximized area and weight, and it remains visible over the whole perimeter of the card, and over almost its whole thickness, contributing to the high-end look of the product.

The first subject of the invention is consequently a hybrid contact and contactless chip card, comprising a card body provided with a cavity into which an electronic module is inserted comprising a microelectronic chip connected to an inductive or capacitive coupling means for coupling with, or a physical connection to, at least one antenna arranged in the card body, characterized in that the card body comprises a metal plate forming a core provided at its periphery with at least one metal edge delimiting at least one recess in which the layers of at least one insert of the chip card are positioned, so that said metal edge forms the periphery of the chip card over most of the thickness of the chip card.

Preferably, said core and said at least one metal edge are formed from a single metal plate by forming at least one recess in said metal plate so as to form said at least one edge. In this way, the periphery of the chip card displays a single-piece metal edge, without any added parts, thereby giving it a particularly pleasing look from an esthetic point of view.

According to one embodiment, the metal core is arranged inside the card body and it comprises two edges that extend on either side of the surface of the metal core over a total thickness substantially equal to the whole of the thickness of the card.

In this case, the chip card comprises, on either side of the surface of the metal core, an insert comprising a stack of layers comprising, from the metal core to the outside of the card, a layer of electrically insulating material, a ferrite layer, an antenna, an optional plastic layer acting as a spacer, and a printed or transparent protective outer layer.

According to one embodiment, the protective outer layers extend over the edges of the metal layer, as far as the outer edge of the card body.

According to one variant embodiment, the protective outer layers extend as far as the inner periphery of the edge of the metal layer.

According to another embodiment, the metal core is arranged on a first outer face of the card body and its edge extends in the direction of the second outer face of the card body, substantially over the whole of the thickness of the card.

In this case, the chip card comprises a stack of layers comprising, from the metal core to the outer face of the chip card, a first plastic layer allowing the metal of the ferrite and of the antenna to be insulated so as to obtain better radiofrequency behavior, a ferrite layer, a layer of electrically insulating material (PVC or adhesive), an antenna that is inductively or capacitively coupled with, or directly connected to, the antenna of the module, a second plastic layer forming a spacer, and an overlay protective outer layer, made for example of printed or transparent PVC.

Advantageously, the metal plate is made of a heavy metal, notably chosen from tungsten, steel, stainless steel, titanium, gold, iridium, osmium, platinum, or silver, preferably tungsten.

The core of the metal plate has a thickness of the order of 100 micrometers to 400 micrometers, the total thickness of the card being between 680 micrometers and 840 micrometers, in accordance with ISO standard 7810.

As a result, the metal plate has a weight of the order of 10 to 25 grams, and the total weight of the chip card may be of the order of 15 to 30 grams, which is substantially more than the weight of conventional plastic cards.

Another subject of the invention is a method for manufacturing a chip card according to the invention, comprising steps of:
1, providing a metal plate having a thickness substantially corresponding to the thickness of a chip card according to ISO standard 7810;
2. machining said plate over a fraction of its thickness so as to form at least one recess and to leave a metal core parallel to the plane of the plate and at least one edge extending perpendicular to the plane of the card at the periphery of the metal core;
3. forming a void in the metal plate comprising the metal core so as to create a hole at the place reserved for the microelectronic module, then filling it with an electrically insulating spacer. This has two aims: 1/ allowing the electromagnetic flux to flow through the metal plate via this hole, and 2/ allowing the two antennas to be coupled with each other and with the module antenna.
4. forming a laminated insert;
5. placing the one or more laminated inserts in the one or more recesses;
6. securing the various layers to one other by hot rolling a printed and/or transparent and electrically insulating surface layer;
7. cutting the metal plate and the set of layers outside the metal edge so as to obtain a chip card in ISO 7810 format.

Other features and advantages of the invention will become apparent upon reading the detailed description and the appended drawings, in which:

FIG. 1 shows a chip card according to a first known embodiment;

FIG. 2 shows a cross-sectional view of a second known embodiment;

FIG. 3 shows an exploded perspective view of a third known embodiment;

FIG. 4 shows a cross-sectional schematic view of a chip card according to the invention;

FIG. 5 shows a plan view of the chip card of FIG. 4 before the module is embedded;

FIG. 6 shows a cross-sectional schematic view of a second embodiment of the chip card according to the invention.

DETAILED DESCRIPTION

In order to make it easier to understand and see the structure, the thicknesses of the layers of materials in the cross-sectional views (FIGS. 4 and 6) are highly exaggerated with respect to the real proportions of a chip card.

Identical elements in FIGS. 4 to 6 bear the same reference numbers.

FIG. 1 corresponds to FIG. 5C of document US 2016/0110639 A1 (Finn), which describes in particular chip cards having a metal layer. According to this document, for correct contactless operation of this chip card the metal layer is required to have a slit (530 (S)). Now, this slit remains visible on the finished product in certain luminosity or lighting conditions, which is not acceptable to customers for high-end products, the appearance of which must be perfect, FIG. 2 corresponds to FIG. 8 of document FR 3032094 A1 (Smart Packaging Solutions). It depicts a chip card comprising a metal plate 11 intended to make the card heavier, and two booster antennas on either side that allow very good radiofrequency communication with a remote reader. However, the metal plate 11 is not visible from the outside of the product, thereby compromising how classy it looks.

FIG. 3 corresponds to FIG. 10A of document WO 2018/152218 A1 (CPI Card Group). It shows a card provided with a metal frame (210) and a non-metal insert (280). As a consequence of its small size, the contribution of the metal frame to the weight of the card remains very limited, FIG. 4 shows a schematic cross-sectional view of a first embodiment of the chip card according to the invention. In this embodiment, the card body 1 comprises a metal plate forming a central core 3, with a thickness of 200 to 600 micrometers, which constitutes most of the mass of the card. This central core 3 extends as far as the periphery of the card body 1, where it is continued by two edges 4, 5 that extend perpendicular to the central core 3 so as to delimit two volumes on either side of the central core 3 that allow the other layers and components of the chip card to be accommodated, which form an insert.

The central core 3 is pierced from one side to the other by a hole 13 that allows the microelectronic module 2 to be inserted. Between the wall of the hole 13 and the module 2 an insulating spacer 11 is arranged that notably makes it possible to prevent the ferrite layers 7 from deforming and moving into the hole 13 during the phase of assembling the product by lamination.

The metal edges 4, 5 extend substantially over the whole of the thickness of the card, with the possible exception, as shown, of the protective outer layer 10, called the "overlay". In this way a chip card with a very pleasing look is obtained, most of the visible periphery of which, or even the whole visible part of which, is made of visible metal.

According to the example shown, the stack of layers that are arranged on either side of the metal core 3 comprises, from the central core 3 to the outside of the card, an electrically insulating layer 6, made for example of PET, that is 30 to 60 micrometers thick, a ferrite layer 7 that is 50 to 200 micrometers thick, an antenna 8 that is 30 to 100 micrometers thick and connected to or coupled with an antenna (not shown) arranged on the module 2 of the chip card, a plastic layer 9, for example made of PVC, that is 50 to 200 micrometers thick and serves as a spacer so as to obtain the desired final thickness of the card, and finally a protective outer layer 10, that is approximately 50 micrometers thick and typically made of PVC. The insulating layers 6 allow the ferrite layer 7 and the antenna 8 to be separated from the metal core 3, thereby allowing the electromagnetic operation of the chip card to be optimized.

By virtue of this structure, each stack on either side of the metal core 3 allows good-quality communication with a remote reader to be obtained, whatever the orientation of the chip card.

In this FIG. 4, the protective outer layer 10, typically a printed or transparent layer, extends over the edges 4, 5 of the metal layer, as far as the outer edge of the card body 1, such that the visible thickness of the edges 4, 5 is equal to the thickness of the card minus the thickness of the two overlay layers 10. However, when the outer layers 10 are chosen to be made of transparent material, the edges 4, 5 may also be seen through the upper face and lower face of the chip card, thereby contributing to the pleasing look of the chip card.

According to another embodiment (not shown), the protective outer layer 10 extends as far as the inner periphery of the metal edges 4, 5. In this case, the visible metal edges 4, 5 have a thickness equal to the whole thickness of the chip card, which constitutes the most pleasing version from an esthetic point of view.

The actual dimensions and characteristics of the layers of material in the stack and their thicknesses will be easily determined by a person skilled in the art depending on the applications envisaged, FIG. 5 depicts a plan view of the chip card of FIG. 4, in a cross-sectional plane parallel to the plane of the card and passing through a layer 8 comprising an antenna. This FIG. 5 depicts in particular the metal edge 4, 5 that runs all around the chip card, and also the geometry of one of the two antennas of the product, comprising a large turn 8a in "ID-1" format and a concentrator antenna 8b that is intended to be coupled with the antenna of the module 2 (not shown). FIG. 5 corresponds to a depiction before the module is embedded in the card body. The cavity 12 into which the module is inserted may also be seen therein.

FIG. 6 shows another embodiment, in which the metal core 3 is arranged on a first outer face of the card body and a single edge 4 extends in the direction of the second outer face of the card body.

Here again, the chip card comprises a stack of layers comprising, from the metal core 3, a first plastic layer 6, a ferrite layer 7, a single antenna 8, a second plastic layer 9, and a protective outer layer 10.

This embodiment has the advantage of leaving the whole surface of the metal plate, and also its edge 4, visible over the whole of the thickness of the chip card, possibly minus the thickness of the overlay 10. Furthermore, this embodiment is particularly simple to manufacture, as the other layers 7, 8, 9, 10 of the card are all located on one and the same side of the metal plate. These advantages are, however, obtained at the price of radiofrequency communication being limited to a single face of the chip card.

The metal plate may be machined so as to form the metal core 3 and the edges 4, 5 notably by milling, or even by molding.

In practice, instead of producing one card after another, it is possible to work on larger sheets comprising a metal plate and a plurality of inserts, the whole being assembled and the finished cards being cut out so as to obtain individual cards in ISO 7810 format.

Advantages of the Invention

In summary, the invention provides a chip card design that makes it possible to achieve the aims targeted.

It uses a plate made of a heavy material, typically a metal like tungsten or similar, which is visible over the whole perimeter of the card and almost over the whole thickness of the card. The structure of the card body makes it possible to eliminate or to limit the shielding effects of this metal plate against radiofrequency signals to be exchanged with a chip card reader.

In particular, the structure of the chip card according to the invention makes it possible to obtain entirely satisfactory radiofrequency communication performance on at least one of the faces of the chip card with respect to the standards in force.

The invention claimed is:

1. A hybrid contact and contactless chip card, comprising a card body provided with a cavity into which an electronic module is inserted, the electronic module comprising a microelectronic chip connected to an inductive or capacitive component for coupling with, or a physical connection to, at least one antenna arranged in the card body, wherein the card body comprises a metal plate forming a core provided at its periphery with two metal edges delimiting two recesses on opposite sides of the metal plate and in which the layers of at least one insert of the chip card are positioned, so that that said two metal edges form the periphery of the chip card over most of the thickness thereof.

2. The chip card as claimed in claim 1, wherein said core and said two metal edges are formed from a single metal plate by forming said two recesses in said single metal plate so as to form said two metal edges.

3. The chip card as claimed in claim 1, wherein it comprises, on either side of the metal core, an insert comprising a stack of layers comprising, from the inside to the outside of the card, a layer of electrically insulating material, a ferrite layer, an antenna, an optional plastic layer acting as a spacer, and a printed or transparent protective outer layer.

4. The chip card as claimed in claim 3, wherein the protective outer layer extends over the edge of the metal core, as far as the outer edge of the card body.

5. The chip card as claimed in claim 4, wherein the protective outer layer extends as far as the inner periphery of the edge of the metal core.

6. The chip card as claimed in claim 1, wherein the metal plate is made of a heavy metal, notably chosen from tungsten, steel, stainless steel, titanium, gold, iridium, osmium, platinum, or silver, preferably tungsten.

7. The chip card as claimed in claim 1, wherein the metal plate possesses a core with a thickness of the order of 100 micrometers to 400 micrometers, the total thickness of the card being between 680 micrometers and 840 micrometers, in accordance with ISO standard 7810.

8. The chip card as claimed in claim 1, wherein the metal plate has a weight of the order of 10 to 25 grams, the total weight of the chip card being of the order of 15 to 30 grams.

9. A method for manufacturing a chip card as claimed in claim 1, comprising the steps of:
  providing a metal plate having a thickness substantially corresponding to the thickness of a chip card according to ISO standard 7810;
  machining said plate over a fraction of its thickness so as to form at least one recess and to leave a metal core parallel to the plane of the plate and at least one edge that is joined to the core and extends perpendicular to the periphery of the metal core;
  forming a void in the metal plate comprising the metal core so as to form a hole therein at the place reserved for the microelectronic module, then filling it with an electrically insulating spacer;
  forming a laminated insert comprising a plurality of layers;
  placing the one or more laminated inserts in the one or more recesses;
  securing the various layers to one other by hot rolling an electrically insulating printed and/or transparent surface layer;
  cutting the metal plate and the set of layers outside the metal edge so as to obtain a chip card in ISO 7810 format.

10. The method as claimed in claim 9, wherein the laminated insert is composed of a first electrically insulating layer, a ferrite layer, a second electrically insulating layer, an antenna, and a third electrically insulating layer forming a spacer.

* * * * *